(12) United States Patent
Palma

(10) Patent No.: US 9,592,845 B2
(45) Date of Patent: Mar. 14, 2017

(54) STAGING CART FOR TRANSPORTING MATTRESSES

(71) Applicant: DREAMWELL, LTD., Las Vegas, NV (US)

(72) Inventor: Jaime Palma, Roswell, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 0 days.

(21) Appl. No.: 15/003,953

(22) Filed: Jan. 22, 2016

(65) Prior Publication Data

US 2016/0214634 A1    Jul. 28, 2016

Related U.S. Application Data

(60) Provisional application No. 62/106,953, filed on Jan. 23, 2015.

(51) Int. Cl.
*B62B 3/10*  (2006.01)
*B62B 3/04*  (2006.01)
*B62B 3/14*  (2006.01)

(52) U.S. Cl.
CPC ............. *B62B 3/04* (2013.01); *B62B 3/108* (2013.01); *B62B 3/1476* (2013.01); *B62B 3/1492* (2013.01)

(58) Field of Classification Search
CPC ......... B62B 3/04; B62B 3/108; B62B 3/1476; B62B 3/1492

(Continued)

(56) References Cited

U.S. PATENT DOCUMENTS

| 685,160 A | 10/1901 | Marshall |
| 1,706,267 A * | 3/1929 | Van De Mark ........... B62B 3/04 |
| | | 280/47.34 |

(Continued)

FOREIGN PATENT DOCUMENTS

| CH | 683840 A5 | 5/1994 |
| DE | 2856600 A1 | 7/1980 |

(Continued)

OTHER PUBLICATIONS

Goldman R.P., et al: "A Constraint-Based Scheduler for Batch Manufacturing," IEEE Expert, IEEE Service Center, New York, NY, US. vol. 12, No. 1: Jan. 1, 1997, pp. 49-56, XP000689724.

(Continued)

*Primary Examiner* — Hau Phan
*Assistant Examiner* — Jacob Meyer
(74) *Attorney, Agent, or Firm* — Cantor Colburn LLP

(57) ABSTRACT

A staging cart for moving multiple packaged mattresses generally includes a base frame having a length and a width dimension; a handle frame extending upwardly from a rear end of the cart; a pair of rear wheels and a pair of forward wheels mounted to a bottom surface of the base frame at the rear and forward ends of the base frame, respectively; a platform portion coupled to the base frame spanning a length of the base frame and having a planar surface, wherein the platform portion has a width dimension less than the width dimension of the base frame and is medially located within the base frame; and at least one roller coupled to the base frame spanning the length dimension and adjacent to at least one side of the platform portion, wherein the at least one roller has an axis of rotation parallel to the longitudinal axis of the platform portion.

8 Claims, 3 Drawing Sheets

(58) Field of Classification Search
USPC ........ 280/35, 656, 47.34, 47.35, 79.11, 79.2, 280/79.3, 79.4, 79.7
See application file for complete search history.

(56) References Cited

U.S. PATENT DOCUMENTS

| | | | |
|---|---|---|---|
| 1,733,660 A | 10/1929 | Gail | |
| 2,604,210 A * | 7/1952 | Boone | B62B 3/10 211/28 |
| 3,279,631 A * | 10/1966 | McCartney | B65G 67/00 193/35 MD |
| 3,689,106 A * | 9/1972 | Young | B62D 53/00 280/408 |
| 3,720,329 A * | 3/1973 | Gamble | B62D 63/06 188/119 |
| 3,885,691 A * | 5/1975 | Knapp | B62D 53/06 280/43.18 |
| 3,934,740 A * | 1/1976 | Rumell | B62D 53/0821 280/43.23 |
| 4,000,870 A * | 1/1977 | Davies | B64D 9/003 244/137.1 |
| 4,020,959 A * | 5/1977 | Livesay | B62B 5/049 188/5 |
| 4,049,286 A * | 9/1977 | Francis, Jr. | B64D 11/00 248/500 |
| 4,234,983 A | 11/1980 | Stumpf | |
| 4,234,984 A | 11/1980 | Stumpf | |
| 4,274,168 A * | 6/1981 | Depowski | A61G 7/1034 414/523 |
| 4,355,940 A * | 10/1982 | Derickson | B65G 67/20 414/345 |
| 4,439,977 A | 4/1984 | Stumpf | |
| 4,451,946 A | 6/1984 | Stumpf | |
| 4,523,344 A | 6/1985 | Stumpf | |
| 4,541,768 A * | 9/1985 | Walker | B60P 1/52 193/35 MD |
| 4,565,046 A | 1/1986 | Stumpf | |
| 4,578,834 A | 4/1986 | Stumpf | |
| 4,787,808 A * | 11/1988 | Shimoji | B62B 3/04 193/35 A |
| 4,806,061 A * | 2/1989 | Fenton | B60P 1/52 280/149.2 |
| 4,832,185 A * | 5/1989 | Huber | B65G 39/12 198/788 |
| 4,839,933 A * | 6/1989 | Plewright | A61G 7/1019 5/428 |
| D303,030 S * | 8/1989 | Goldston | B62B 3/00 D34/12 |
| 4,873,732 A * | 10/1989 | Perez | A61G 7/1019 414/345 |
| 5,016,305 A | 5/1991 | Suenens et al. | |
| 5,161,844 A | 11/1992 | Zimmer et al. | |
| 5,326,212 A * | 7/1994 | Roberts | B60P 1/6481 160/201 |
| 5,478,190 A * | 12/1995 | Helton | B60P 1/52 193/35 A |
| 5,495,809 A * | 3/1996 | Carbo | B65G 7/04 105/157.1 |
| 5,613,287 A | 3/1997 | St. Clair | |
| 5,621,935 A | 4/1997 | St. Clair | |
| 5,704,624 A * | 1/1998 | Davis | B62B 3/00 280/19 |
| 5,746,877 A | 5/1998 | Notheis et al. | |
| 5,934,041 A | 8/1999 | Rudolf et al. | |
| 6,079,941 A * | 6/2000 | Lee | B62B 3/04 16/35 R |
| 6,178,723 B1 * | 1/2001 | Mossbeck | B65B 9/02 53/450 |
| 6,273,257 B1 | 8/2001 | Mossbeck | |
| 6,386,560 B2 * | 5/2002 | Calender | B62B 5/0083 280/47.34 |
| 6,817,578 B1 * | 11/2004 | Garcia | B65D 19/0002 244/118.1 |
| 6,860,493 B2 * | 3/2005 | Orozco | B60B 33/0002 280/33.991 |
| 7,007,790 B2 * | 3/2006 | Brannon | B65G 69/22 198/346 |
| 7,383,676 B1 * | 6/2008 | Schmidt | B65B 9/026 53/374.8 |
| 7,465,143 B1 * | 12/2008 | Adams | B60P 1/52 193/35 A |
| 7,731,206 B2 * | 6/2010 | Borrmann | B62B 3/008 280/47.34 |
| 7,731,207 B2 * | 6/2010 | Santos Gomez | B64F 5/0036 280/408 |
| 8,042,829 B2 * | 10/2011 | Hailston | B62B 3/008 280/30 |
| 8,104,807 B2 | 1/2012 | Maffeis | |
| 8,596,611 B1 * | 12/2013 | Fountain | B66F 9/19 254/2 R |
| 8,851,488 B2 * | 10/2014 | Carruyo | B60P 7/08 280/656 |
| 8,979,099 B1 * | 3/2015 | Ellis | B66F 9/142 280/43.12 |
| 9,192,266 B2 * | 11/2015 | Starr | F16M 11/42 |
| D744,713 S * | 12/2015 | Della Polla | B62B 3/00 D34/23 |
| 9,216,752 B1 * | 12/2015 | Carruyo | B60P 7/08 |
| 2004/0227086 A1 | 11/2004 | Haug et al. | |
| 2004/0261186 A1 | 12/2004 | Gladney | |
| 2008/0012260 A1 * | 1/2008 | Ouyang | B62B 3/1476 280/79.11 |
| 2010/0071136 A1 | 3/2010 | Weber | |
| 2010/0281666 A1 | 11/2010 | Tseng | |
| 2012/0091688 A1 * | 4/2012 | Fink | B60P 3/1033 280/414.1 |

FOREIGN PATENT DOCUMENTS

| | | |
|---|---|---|
| DE | 3540233 A1 | 11/1985 |
| DE | 4307142 C1 | 5/1994 |
| DE | 202012100849 U1 | 5/2012 |
| DE | 102011083451 A1 | 3/2013 |
| EP | 2316783 A1 | 10/2009 |
| JP | S59162056 U | 10/1984 |
| JP | 2005333827 A | 12/2008 |
| WO | 9627553 A1 | 12/1996 |
| WO | 2009103173 A1 | 8/2009 |
| WO | 2013041894 A1 | 3/2013 |

OTHER PUBLICATIONS

Notification of Transmittal of the International Search Report and the Written Opinion of the International Searching Authority, or the Declaration, issued in International Application No. PCT/US2016/014473, mailed Apr. 4, 2016; 5 pages.

Notification of Transmittal of the International Search Report and the Written Opinion of the International Searching Authority, or the Declaration, issued in International Application No. PCT/US2016/014474, mailed Apr. 19, 2016; 6 pages.

Notification of Transmittal of the International Search Report and the Written Opinion of the International Searching Authority, or the Declaration, issued in International Application No. PCT/US2016/014476, mailed Apr. 4, 2016; 10 pages.

Notification of Transmittal of the International Search Report and the Written Opinion of the International Searching Authority, or the Declaration, issued in International Application No. PCT/US2016/014482, mailed Apr. 20, 2016; 6 pages.

Notification of Transmittal of the International Search Report and the Written Opinion of the International Searching Authority, or the Declaration, issued in International Application No. PCT/US2016/014525, mailed Apr. 8, 2016; 11 pages.

Notification of Transmittal of the International Search Report and the Written Opinion of the International Searching Authority, or the Declaration, issued in International Application No. PCT/US2016/014576, mailed Apr. 25, 2016; 4 pages.

Written Opinion of the International Searching Authority, issued in International Application No. PCT/US2016/014473, mailed Apr. 4, 2016; 6 pages.

(56) References Cited

OTHER PUBLICATIONS

Written Opinion of the International Searching Authority, issued in International Application No. PCT/US2016/014474, mailed Apr. 19, 2016; 6 pages.
Written Opinion of the International Searching Authority, issued in International Application No. PCT/US2016/014476, mailed Apr. 4, 2016; 10 pages.
Written Opinion of the International Searching Authority, issued in International Application No. PCT/US2016/014482, mailed Apr. 20, 2016; 6 pages.
Written Opinion of the International Searching Authority, issued in International Application No. PCT/US2016/014576, mailed Apr. 25, 2016; 6 pages.
Notification of Transmittal of the International Search Report and the Written Opinion of the International Searching Authority, or the Declaration, issued in International Application No. PCT/US2016/014480, mailed Jun. 21, 2016; 5 pages.
Written Opinion of the International Searching Authority, issued in International Application No. PCT/US2016/014480, mailed Jun. 21, 2016; 6 pages.

* cited by examiner

STAGING CART FOR TRANSPORTING MATTRESSES

CROSS-REFERENCE TO RELATED APPLICATIONS

This application is a NON-PROVISIONAL of and claims the benefit of U.S. Application No. 62/106,953, filed Jan. 23, 2015, which is incorporated herein by reference in its entirety.

BACKGROUND

The present disclosure generally relates to wheeled carts for transporting objects, and more particularly, to staging carts adapted for use in mattress manufacturing and storage facilities to facilitate movement of multiple packaged mattresses packaging from and to and area, e.g., from a pre-staging area to a shipping container.

The transportation of large, heavy or unwieldy articles such as mattresses remains a problem, even in the professional moving industry. The need to move or lift such articles, using only human power, has led to the development of helpful devices such as dollies, pulley/lever assemblies, hand trucks and the like. However, despite the existence of many such manual devices, there remain situations where all known devices are useless (e.g. movement of unwieldy and/or limp articles within typical buildings) and/or inefficient.

The typical mattress is very heavy, very limp, and commonly equipped only with a limited handle or support strap carrying system. The locations of the handles/support straps are such that they become useless in many scenarios (e.g. ascending/descending a flight of stairs, regardless of whether or not the flight includes one or more turns). Moreover, simultaneously moving multiple mattresses using handles is difficult. Mattresses can weigh hundreds of pounds, and the lack of appropriate means to hold on to a mattress makes manipulation within a typical home an exasperating, and often exhausting, process even for physically imposing individuals. It is a two-person job, and there is no way for two people to get four arms around a mattress.

During the manufacture and/or storage of mattresses, the mattresses are typically first packaged in heavy gauge plastic and/or boxes suitable for transportation. The packaged mattresses are then stacked on top of one another on the ground, where one of the major surfaces of the mattress, i.e., top or bottom surfaces, is oriented to face the ground. It is generally a two or more person task to move the stack of packaged mattresses from the ground location to another area, e.g., a shipping container. Moreover, the process is generally inefficient since one mattress at a time is typically moved. Even in instances where multiple stacked mattresses are carried by a movable cart, the carts generally have a fixed surface that still requires two or more individuals to physically lift the mattresses from the face-down orientation to the other area.

BRIEF SUMMARY

Disclosed herein is a staging cart for loading and unloading packaged mattresses. In one embodiment, the cart includes a base frame having a length and a width dimension; a handle frame extending upwardly from the rear end of the cart; a pair of rear wheels and a pair of forward wheels are mounted to a bottom surface of the base frame at the rear and forward ends of the base frame, respectively; a platform portion coupled to the base frame spanning a length of the base frame and having a planar surface, wherein the platform portion has a width dimension less than the width dimension of the base frame and is medially located within the base frame; and at least one roller spanning the length dimension of and adjacent to at least one side of the platform portion, wherein the at least one rollers are rotatably coupled to the base frame and have an axis of rotation parallel to the longitudinal axis of the platform portion.

The disclosure may be understood more readily by reference to the following detailed description of the various features of the disclosure and the examples included therein.

DETAILED DESCRIPTION

Figure 1:
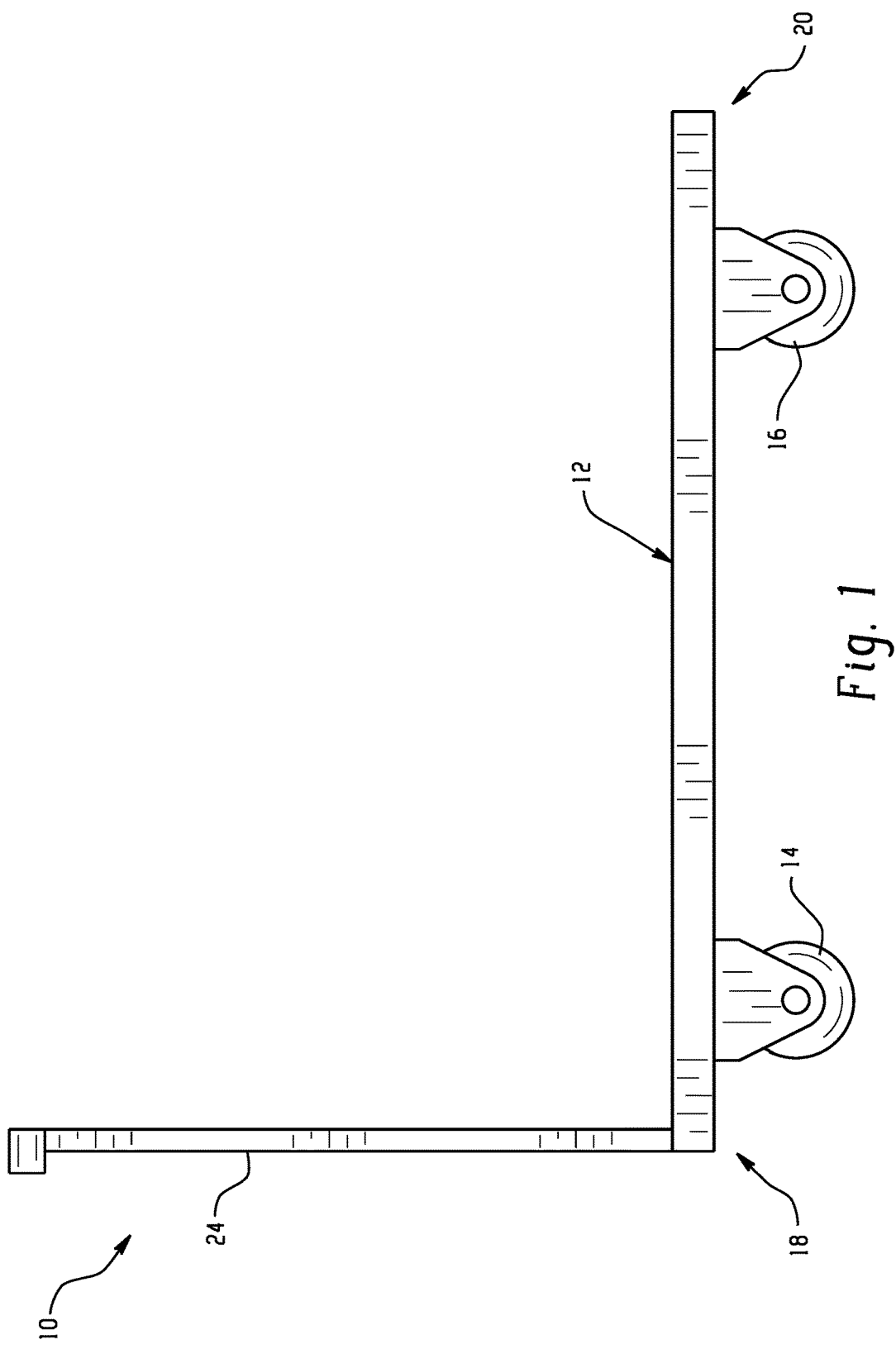
FIG. 1 illustrates a perspective view of a mattress encapsulated in a plastic wrap.
Figure 2:
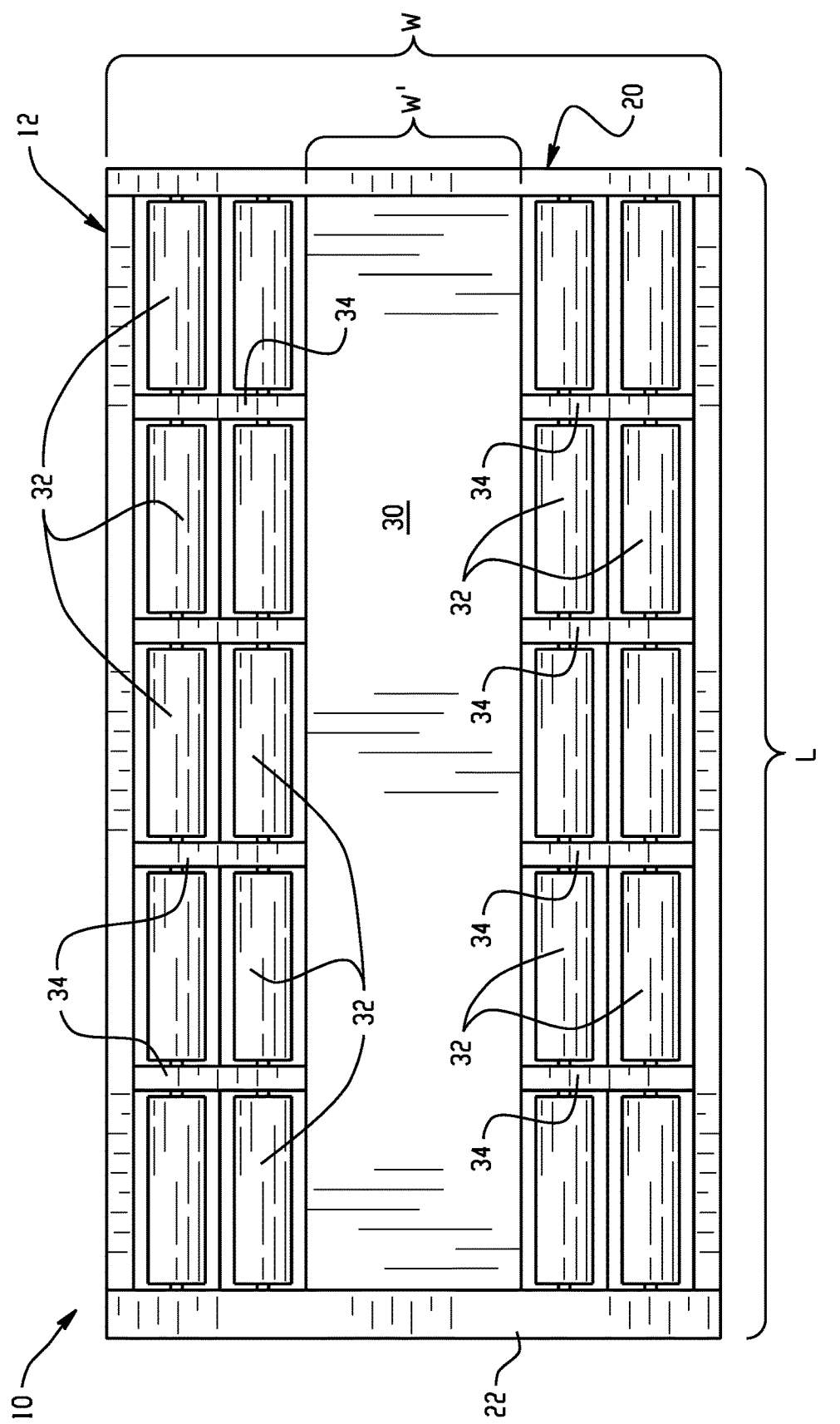
FIG. 2 is a perspective view of first and second pieces of extruded plastic film located above and below a bedding product.
Figure 3:
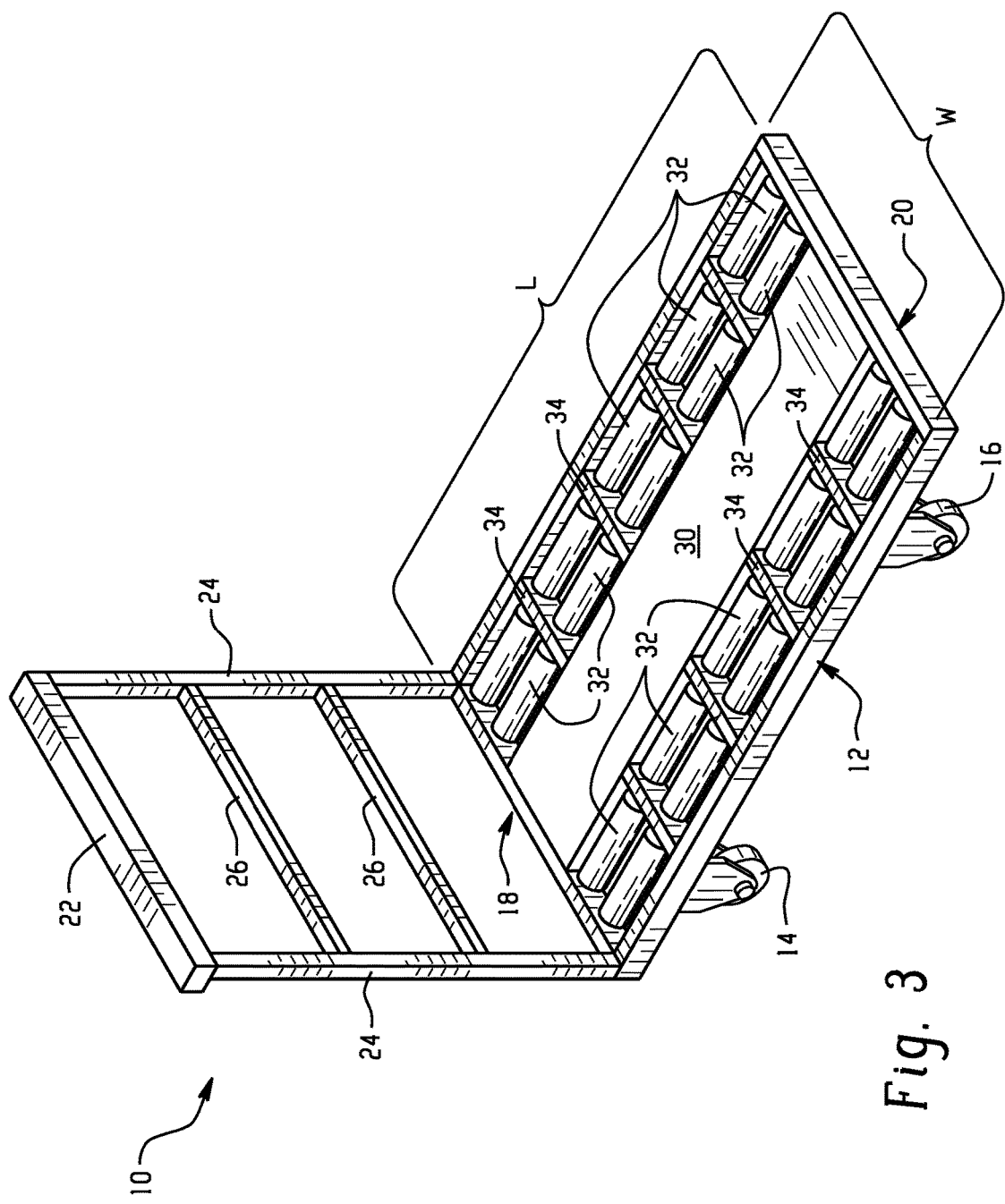
FIG. 3 is a perspective view of a bedding product individually wrapped in a plastic film package after the first and second pieces of extruded plastic film shown in FIG. 2 are welded together.

FIGS. 1-3 of the drawings illustrate a staging cart 10 according to an exemplary embodiment of the invention. The cart 10 generally comprises a base frame 12 having a width (W) and length (L) dimension that is generally square or rectangularly shaped. A pair of rear wheels 14 and a pair of forward wheels 16 are mounted to a bottom surface of the base frame 12 at the rear, and forward ends 18, 20 of the frame 12, respectively. By way of example, the wheels can be caster wheels formed of rubber configured to swivel 360 degrees. In some embodiments, the wheels may include brakes and/or locks. A horizontal handle frame 22 is coupled to legs 24, which project upwardly from the rear end 18 of base frame 12. One or more cross bars 26 may extend between the legs 16 adjacent the horizontal handle frame 22.

A platform portion 30 spanning the length dimension of the base frame is attached to the base frame and extends from the rear end 18 to the front end 20. The platform portion 30 has a width (W1) less than the base frame width (W) and is medially located within and carried by the base frame 12. The platform portion can be made of any material and is configured to have a planar surface to support to multiple mattresses when the cart is in use. In one embodiment, the platform portion 30 includes an upper planar contact surface of a low coefficient of friction material relative to steel and having relatively high abrasion resistance. Exemplary materials include various plastics including but not limited to polyolefin, polystyrenes and the like. By way of example, the contact surface can be formed of polyethylene, polypropylene and the like.

One or more rows of rollers 32 are disposed on each side of the platform portion with the base frame 12, two of which are shown. However, it should be apparent that more or less rows of rollers can be used. The rollers are carried by shafts (not shown) journaled to support rails defined by the base frame such as the front and rear ends 18, 20 of the base frame, and in some embodiments, sectional support members 34 (shown more clearly in FIG. 2), which generally span a distance between the platform portion and the base frame, i.e., orthogonal to the platform portion and configured to support sections of rollers spanning the length of the base frame as shown. The rollers 32 are not intended to be limited to any particular type and generally include an elongated hollow tube having at the ends thereof a bearing assembly. In some embodiments, one or more rows of a single roller rotatably spanning the length of the platform and rotatably coupled to the front and rear ends may be employed. In other embodiments, each row may be formed of multiple rollers, which collectively span the length of the platform portion 30 such as is shown in the Figures. The top portions of the rollers 32 are substantially coplanar and in some embodiments slightly raised relative to the planar surface of the platform portion 30. As such, each roller has an axis of rotation parallel to the longitudinal axis of the platform portion 30. In this manner, mattresses stacked on their sides on the staging cart may be movably supported by the rollers during loading and unloading of the mattresses from/to the cart 10. As such, an individual instead of lifting the entire weight of the mattress simply rolls the mattress on its side off of the cart and into the desired location.

In operation, mattresses, e.g., boxed, plastic wrapped, and/or the like packaged mattresses are placed side-by-side onto the cart 10. An individual can then push or pull the cart 10 from a staging area to a desired location to unload the mattresses. For example, the individual may be a loading dock worker and maneuver the cart with the packaged mattresses into a trailer of an over the highway tractor trailer. Once there, the individual can simply and easily unload the side-by-side stacked mattresses by slidably moving and engaging each mattress with the rollers on the cart. As such, the mattresses can be maintained in their side-by-side configuration when stored on the trailer, which is markedly less strenuous than the prior method of stacking the mattresses on top of one another. Moreover, as previously discussed, the prior method required at least two individuals to physically lift the mattresses in their entirety for placement from one location to the next, wherein the present process eliminates the need for two individuals to lift the mattress in its entirety. The present process provides significant gains in efficiency and permits an operator to move and unload mattresses with relatively less effort than previously possible.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cart for transporting packaged mattresses, the cart comprising:
   a base frame having a length and a width dimension;
   a handle frame extending upwardly from a rear end of the cart;
   a pair of rear wheels and a pair of forward wheels mounted to a bottom surface of the base frame at the rear and forward ends of the base frame, respectively;
   a platform portion free of rollers coupled to the base frame spanning a length of the base frame and having a planar surface, wherein the platform portion has a width dimension less than the width dimension of the base frame and is medially located within the base frame; and
   at least one roller coupled to the base frame spanning the length dimension and adjacent to at least one side of the platform portion, wherein the at least one roller has an axis of rotation parallel to the longitudinal axis of the platform portion, and wherein the at least one roller spans only a portion of the width dimension.

2. The cart of claim 1, wherein the rear and forward wheels are caster wheels.

3. The cart of claim 1, wherein the platform portion comprises a plastic contact surface.

4. The cart of claim 1, wherein the at least one roller on at least one side of the platform portion comprises two or more rows.

5. The cart of claim 1, wherein the at least one roller is adjacent to each side of the platform portion and comprises two or more rows.

6. The cart of claim 1, wherein the at least one roller coupled to the base frame spanning the length dimension comprises multiple rollers disposed within a row.

7. The cart of claim 1, wherein a top surface of the at least one roller is slightly raised relative to the planar contact surface of the platform portion.

8. The cart of claim 1, wherein a top surface of the at least one roller is coplanar to the planar contact surface of the platform portion.

* * * * *